(12) United States Patent
Brahem et al.

(10) Patent No.: US 10,786,752 B2
(45) Date of Patent: Sep. 29, 2020

(54) EXCHANGE COLUMN DISTRIBUTOR TRAY COMPRISING A DISPERSIVE MATERIAL WITHIN A CHIMNEY FOR GAS PASSAGE

(71) Applicant: IFP Energies nouvelles, Rueil-Malmaison (FR)

(72) Inventors: Rim Brahem, Lyons (FR); Pascal Alix, Roussillon (FR); John Roesler, Vienne (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 394 days.

(21) Appl. No.: 15/821,023

(22) Filed: Nov. 22, 2017

(65) Prior Publication Data
US 2018/0140966 A1 May 24, 2018

(30) Foreign Application Priority Data

Nov. 22, 2016 (FR) ...................... 16 61339

(51) Int. Cl.
| | |
|---|---|
| *B01D 3/00* | (2006.01) |
| *B01D 3/32* | (2006.01) |
| *B01D 53/18* | (2006.01) |
| *B01D 53/26* | (2006.01) |
| *B01J 19/30* | (2006.01) |
| *B01D 3/20* | (2006.01) |

(52) U.S. Cl.
CPC .............. *B01D 3/324* (2013.01); *B01D 3/008* (2013.01); *B01D 3/20* (2013.01); *B01D 53/185* (2013.01); *B01D 53/263* (2013.01); *B01J 19/30* (2013.01)

(58) Field of Classification Search
CPC .......... B01D 3/008; B01D 3/20; B01D 3/324; B01D 53/185; B01D 53/263; B01J 19/30
See application file for complete search history.

(56) References Cited

U.S. PATENT DOCUMENTS

| | | | |
|---|---|---|---|
| 4,427,605 A | 1/1984 | Meier et al. | |
| 5,464,573 A | 11/1995 | Tokerud et al. | |
| 2009/0049864 A1 | 2/2009 | Kovak et al. | |
| 2013/0125751 A1* | 5/2013 | Matten | B01D 53/1475 95/156 |
| 2015/0352462 A1 | 12/2015 | Gluer et al. | |
| 2016/0107099 A1* | 4/2016 | Haroun | B01D 3/008 261/114.5 |

FOREIGN PATENT DOCUMENTS

| | | |
|---|---|---|
| EP | 0206524 A2 | 12/1986 |
| FR | 2936717 A1 | 4/2010 |
| FR | 3006599 A1 | 12/2014 |
| WO | 2014/199035 A2 | 12/2014 |

OTHER PUBLICATIONS

Preliminary Search Report (2 pages).

* cited by examiner

*Primary Examiner* — Cabrena Holecek
(74) *Attorney, Agent, or Firm* — Fitch, Even, Tabin & Flannery LLP

(57) ABSTRACT

The invention is a tray 2 for a column for heat and/or matter exchange between a gas and a liquid, comprising at least one chimney 4 projecting from the upper part of tray 2 for exclusive passage of the gas through the tray, at least one means 5 enabling passage of the liquid through tray 2 and the inside of at least one of the chimneys providing exclusive gas passage being provided with a material dispersive towards said gas.

The invention also relates to an exchange column comprising such a distributor tray and to the use of such a column.

13 Claims, 5 Drawing Sheets

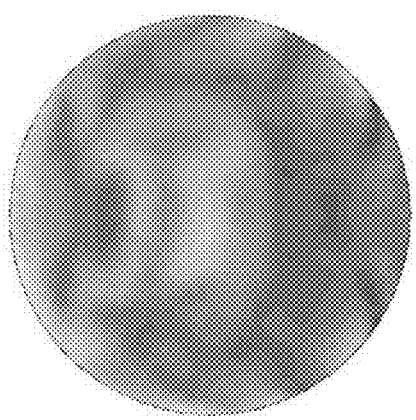 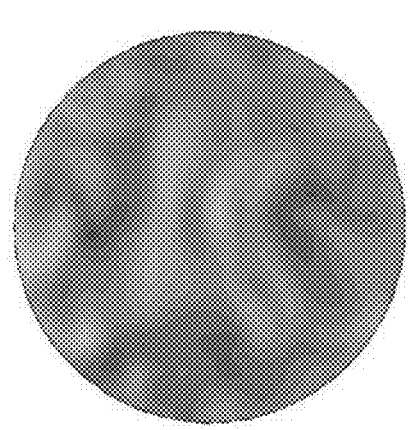 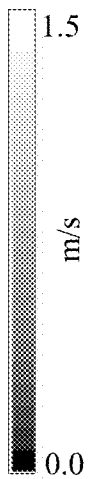
Fig. 6a                     Fig. 6b
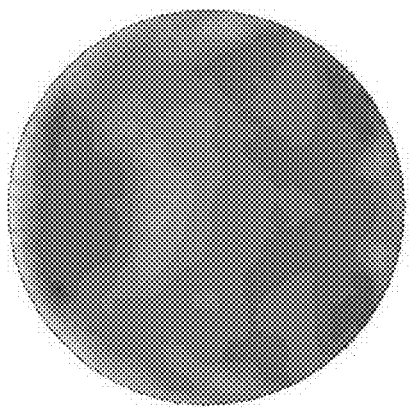 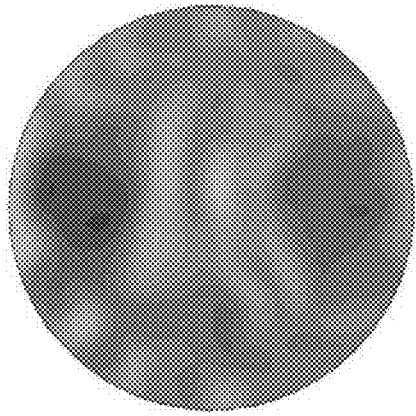 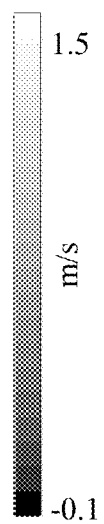
Fig. 6c                     Fig. 6d

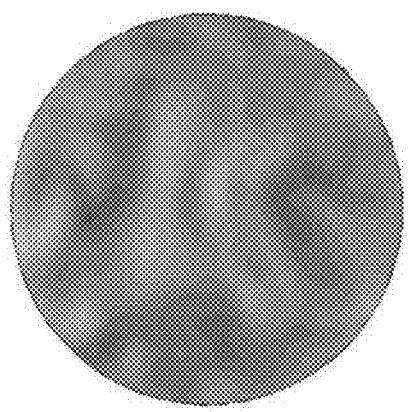
Fig. 7a
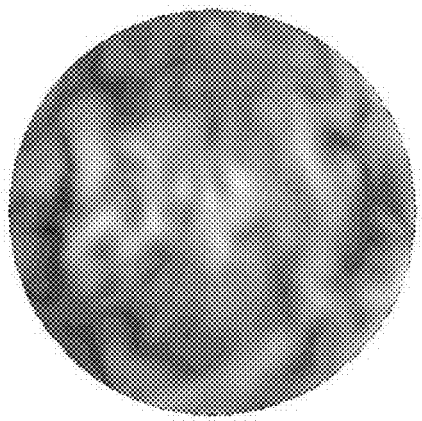
Fig. 7b
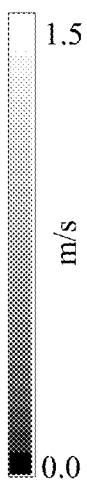
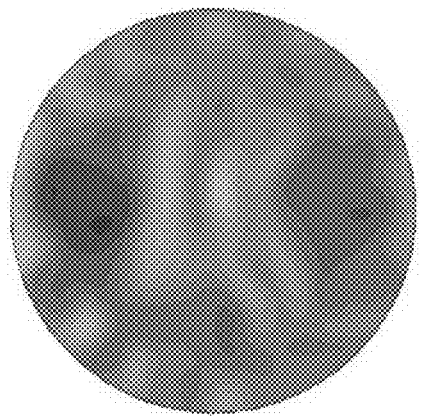
Fig. 7c
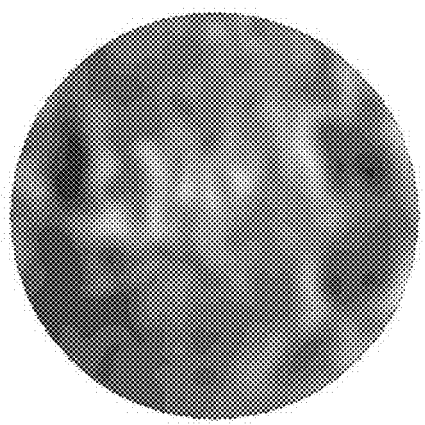
Fig. 7d

EXCHANGE COLUMN DISTRIBUTOR TRAY COMPRISING A DISPERSIVE MATERIAL WITHIN A CHIMNEY FOR GAS PASSAGE

CROSS-REFERENCE TO RELATED APPLICATIONS

This application claims priority from French Patent Application No. 16/61.339, filed Nov. 22, 2016, which is hereby incorporated herein by reference in its entirety.

The present invention relates to the field of gas/liquid contact columns, and more specifically to gas treatment, $CO_2$ capture, dehydration or distillation units.

BACKGROUND OF THE INVENTION

Field of the Invention

Gas treatment units and/or $CO_2$ capture units using amine wash processes and/or distillation and/or dehydration units comprise columns for matter and/or heat exchange between a gas and a liquid, which can for example be liquid or gaseous fluid absorption and regeneration columns. These columns operate under counter-current or co-current gas and or liquid flow conditions.

The columns used in these gas treatment and/or $CO_2$ capture and/or distillation and/or dehydration units generally operate on the principle of matter and/or heat exchange between the gas and the fluids that circulate in the columns. FIG. 1a shows a possible embodiment of the upper part of a gas treatment column 1 (part referred to as column top) and FIG. 1b shows a possible embodiment of the lower part of a gas treatment column 1 (part referred to as column bottom). Conventionally, a gas treatment column 1 comprises several sections 3 filled by a contactor with a distributor tray 2 being arranged between each section 3. The gas/liquid contactor contacts gas G with liquid L to provide exchanges. The purpose of the distributor tray is to distribute liquid L and gas G homogeneously over gas/liquid contactor 3. In the particular case of the column top as shown in FIG. 1a, a gas distributor tray 2 is arranged above a section filled with a contactor 3. In the particular case of the column bottom as shown in FIG. 1b, a gas distributor tray 2 is arranged at the column bottom, below a section filled by a contactor 3.

Standard distributors 2 used in absorption/regeneration or distillation columns generally have a collector/distributor tray equipped with chimneys 4 (also referred to as boxes) allowing passage of the gas through the tray. Under counter-current operating conditions, each chimney 4 allows passage of the gas from the lower part of the column to the upper part of column 1. Chimneys 4 project from one side of tray 2 and they are perpendicular thereto. Each chimney 4 has several walls, for example cylindrical (as shown in FIG. 2a for example) or parallelepipedic (as shown in FIG. 2b for example), which delimit an inner volume open on either side of tray 2. Under counter-current conditions, the liquid is distributed from the top to the bottom of the column, for example through orifices 5 positioned on tray 2 (as shown in FIG. 2a) or through liquid passage chimneys 5 projecting from the upper part of the tray (for example as shown in FIG. 2b and as described in French patent application FR-3,006,599 (WO-2014/199,035). These liquid passage chimneys 5 can communicate with secondary liquid distribution means 5' projecting from the lower part of the tray. In order to prevent the liquid from flowing into gas passage chimneys 4, the gas outlet or inlet opening above the tray is preferably covered by a cap (also referred to as a bevel).

In order to provide good operability of the column and compliance with the specifications relative to the products resulting from gas treatment for example, the column distribution system needs to ensure providing as homogeneous a gas and liquid phase distribution as possible.

An example of distributor trays according to the prior art more particularly intended to improve the gas distribution is disclosed for example in French patent FR-2,936,717, where the gas rises in rectangular chimneys and flows through lateral holes/slots. The slots of two neighboring profiles are offset by half a pitch. U.S. Pat. No. 5,464,573 discloses a device where fins allow the liquid to be collected and sent to boxes connected by a central collection channel. The gas flows through the space between the boxes and then between the fins.

However, distributor trays according to the prior art may have not perfectly homogeneous gas feed rates, which are notably on the edges of such trays, all the more since the diameter of the column is larger.

It is to be noted that, generally speaking, gas distribution homogeneity is all the more difficult to obtain if the packing used as gas/liquid contactor is capacitive. What is referred to as capacity of a packing is the maximum amount of gas that can circulate without flooding the column in relation to a given liquid flow to create liquid accumulation in a part of the packing. The capacity of a packing depends on many factors (angle of the channels, shape of the elements, etc.). It is generally inversely proportional to the specific surface area thereof (also referred to as geometric surface area), which is the contact area per unit volume (expressed in $m^2/m^3$).

SUMMARY OF THE INVENTION

The present invention relates to a distributor tray providing more homogeneous distribution of the gas velocities at the gas passage chimney outlet, notably in the case of large-diameter columns (diameter typically at least equal to 3 m), by using a dispersive material arranged within at least one of the chimneys for passage of the gas.

The invention relates to a distributor tray for a column intended for heat and/or matter exchange between a gas and a liquid, comprising at least one chimney projecting from the upper part of the tray for exclusive passage of the gas through the tray and at least one means for providing passage of the liquid through the tray. The inside of at least one of the chimneys is for providing exclusive passage of the gas provided with a material which disperses the gas.

According to an embodiment of the invention, the dispersive material can be uniformly distributed within the chimney in a longitudinal direction and in a transverse plane.

Advantageously, the dispersive material can be distributed over a thickness at least greater than 10 cm.

According to an embodiment of the invention, the dispersive material can be a random or structured packing.

According to a variant embodiment of the invention, the chimney for exclusive passage of the gas can be substantially parallelepipedic.

According to another variant embodiment of the invention, the chimney for exclusive passage of the gas can be substantially cylindrical.

Advantageously, all of the chimneys for providing exclusive passage of the gas can be provided with the gas dispersive material.

According to an embodiment of the invention, the liquid passage can comprise at least one of orifices and chimneys for providing passage of the liquid.

According to a variant embodiment of the invention, the liquid passage chimneys can project from at least one of the upper part of the tray and from the lower part of the tray.

According to an embodiment of the invention, the tray can comprise liquid passage means uniformly distributed on the tray.

According to a variant embodiment of the invention, the liquid passage means can be downcomers arranged on a periphery of the tray.

Furthermore, the invention relates to a column for providing at least one of heat and matter exchange between a gas and a liquid, wherein the two fluids are contacted by use of at least one gas/liquid contactor with the column comprising at least one distributor tray according to the invention for distributing the fluids over the gas/liquid contactor.

According to an embodiment of the exchange column according to the invention, at least one distributor tray according to the invention can be arranged in the bottom of the column.

According to an embodiment of the exchange column of the invention, the column can comprise sections, and each one of the sections can comprise a gas/liquid contactor and a distributor tray according to the invention.

Moreover, the invention relates to the use of an exchange column according to the invention for a gas treatment, $CO_2$ capture, distillation, dehydration or an air conversion method.

BRIEF DESCRIPTION OF THE FIGURES

Other features and advantages of the method according to the invention will be clear from reading the description hereafter of embodiments given by way of non limitative example, with reference to the accompanying figures wherein:

FIGS. 6a and 6c respectively show the average velocity and the vertical velocity downstream from the distributor according to the prior art, and FIGS. 6b and 6d respectively show the average velocity and the vertical velocity downstream from a variant of a distributor according to the invention; and FIGS. 7a and 7c respectively show the average velocity and the vertical velocity downstream from a variant of a distributor according to the invention for a column diameter D=3.76 m, and FIGS. 7b and 7d respectively show the average velocity and the vertical velocity downstream from the same variant of a distributor according to the invention for a column diameter D=7 m.

DETAILED DESCRIPTION OF THE INVENTION

Figure 1A:
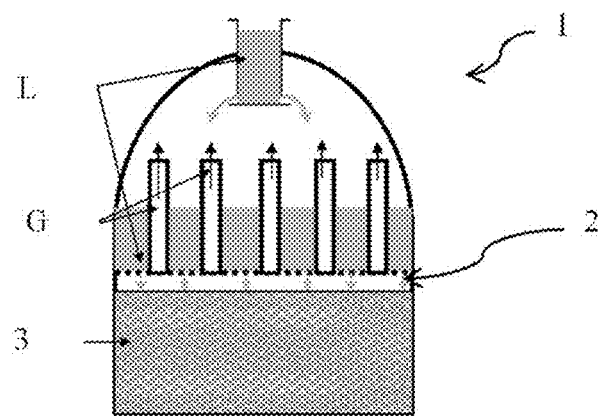
FIGS. 1a and 1b, already described, illustrate the particular case of respectively a top and a bottom of a gas treatment or $CO_2$ capture column equipped with a distributor tray.
Figure 1B:
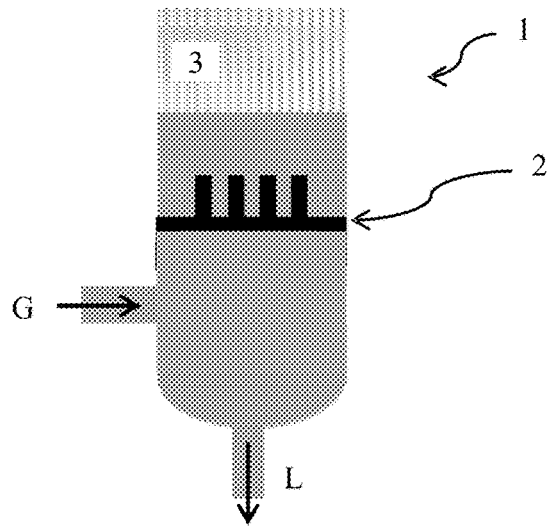
Figure 2A:
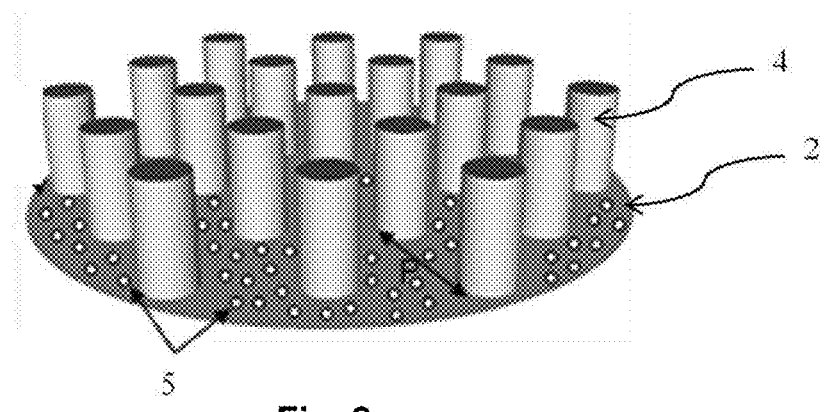
FIGS. 2a and 2b, already described, illustrate distributor trays according to the prior art.
Figure 2B:
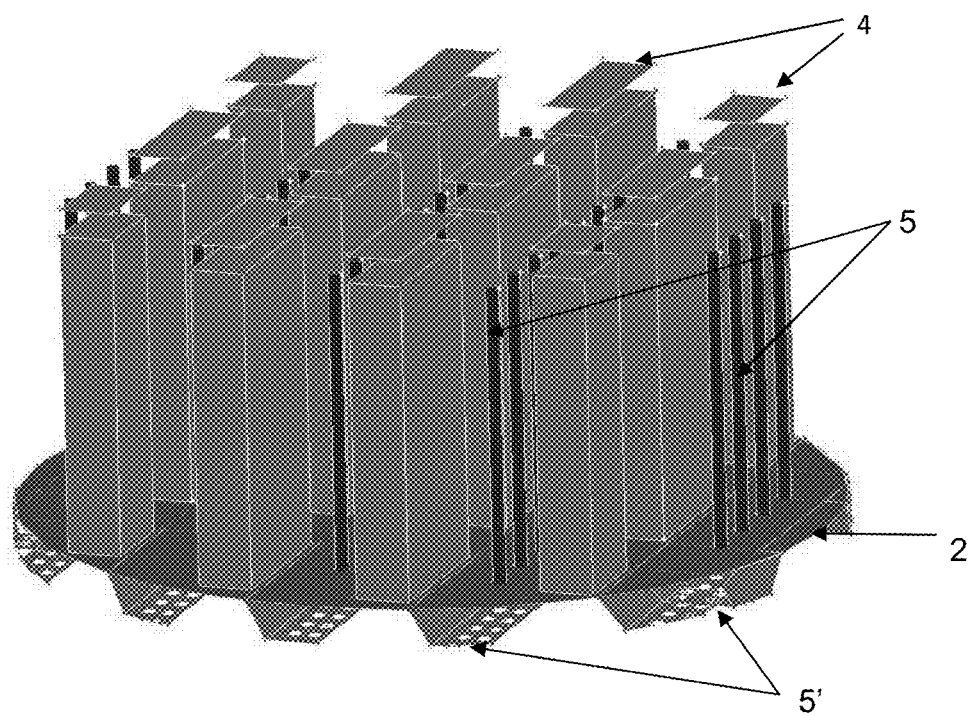

The present invention relates to a distributor tray for a column intended for at least one of heat and matter exchange between a gas and a liquid, comprising at least one chimney projecting from the upper part of the tray for exclusive passage of the gas through the tray and at least one means allowing passage of the liquid through the tray. Conventionally, the distributor tray is substantially cylindrical. The upper part of the distributor tray is understood to be the part of the distributor tray oriented towards the top of the exchange column.

The distributor tray according to the invention is suited for counter-current flows in at least one of heat and a matter exchange column in which the gas rises up through the exclusive gas passage chimneys and the liquid flows down through the liquid passage means.

According to the invention, the chimneys enable exclusive gas passage project from the upper part of the tray (and they are therefore oriented towards the top of the column). These chimneys allow, for columns operating under counter-current conditions, passage of the gas from the bottom of the tray (or lower part) to the top of the tray (or upper part).

According to the invention, chimneys for exclusive gas passage include at least one means for preventing liquid passage through the chimney. This means can be a cap, raised with respect to the chimney. Such a cap allows the gas to escape from the space contained between the cap and the chimney, but it prevents the liquid (flowing in through the top of the upper part of the tray since the distributor tray according to the invention operates under counter-current conditions) from entering the chimney.

Advantageously, exclusive gas passage chimneys have a substantially parallelepipedic and preferably rectangular shape. Indeed, such a geometry allows a wide opening for gas passage, which enables pressure drops to be limited. Furthermore, when the distributor tray comprises gas passage chimneys, they can be arranged parallel to one another. Alternatively, the exclusive gas passage chimneys have a substantially cylindrical shape.

According to the invention, the inside of at least one of the chimneys for exclusive gas passage is provided with a material which disperses the gas, that is a material providing dispersion of the gas as it passes through the chimney, thus generating better distribution (in the sense of homogenization) of the gas as it leaves the chimney. Advantageously, all the chimneys of the distributor tray are provided with a dispersive material which promotes homogenization of the gas stream downstream from the distributor tray.

Advantageously, the dispersive material is distributed within the exclusive gas passage chimney(s) uniformly in a longitudinal direction (the longitudinal direction is the direction of an axis going from the lower part of the tray to the upper part of the tray) and uniformly in a transverse plane. Dispersion of the gas passing through the chimney(s) is thus as homogeneous as possible, which provides a constant gas stream at the chimney(s) outlet over a section corresponding to the section of the chimney(s).

Advantageously, the dispersive material is uniformly distributed over a thickness of at least 10 cm along the longitudinal direction of the chimneys. The gas particles which flow through such dispersive material thicknesses are thus sufficiently dispersed to provide a homogeneous gas stream at the outlet of these chimneys. Advantageously, the dispersive material is uniformly distributed over the entire height of the exclusive gas passage chimneys.

Preferably, the dispersive material that is distributed within at least one exclusive gas passage chimney is a random or structured type packing, preferably of structured type. Indeed, a structured packing provides uniform density of the dispersive medium. A random packing is understood to be anarchic and random piles of unit elements with particular shapes, for example rings, spirals, etc. Heat and/or matter exchanges occur within these unit elements. They can be made of metal, ceramic, plastic or similar materials. Patent applications EP-1,478,457 and WO-2008/067,031 describe two examples of random packing unit elements. Random packing involves interesting qualities in terms of transfer efficiency, low pressure drop and ease of installation. The geometric surface area of the random packing can range between 70 and 250 $m^2/m^3$. A structured packing is understood to be piles of folded plates or sheets, corrugated and arranged in an organized manner in form of large blocks, as described notably in patent applications FR-2,913,353 corresponding to US published patent application 2010/0,213,625, and U.S. Pat. Nos. 3,679,537 and 4,296,050. At least one of heat and matter exchanges occur on these plates. Structured packings afford the advantage of providing a large geometric surface area for a given representative diameter. The geometric surface area of the structured packing can range between 100 and 500 $m^2/m^3$.

Advantageously, all the chimneys for the exclusive passage of the gas are provided with a gas dispersive material.

The liquid passage means enable the liquid to pass from the upper part of the tray to the lower part thereof.

According to an embodiment of the invention, notably in the case of an exchange column of sections, each section has a gas/liquid contactor and a distributor tray. The means allowing passage of the liquid through the tray is a set of chimneys that can project on at least one of the upper side of the tray and the lower side of the tray. For the liquid to pass only through the liquid passage chimneys, and not through the exclusive gas passage chimneys, the liquid passage chimneys are advantageously not as high as the gas passage chimneys. The liquid passage chimneys can be substantially cylindrical. According to another embodiment of the invention, the means allowing passage of the liquid through the tray is a set of orifices provided in the tray. According to another embodiment example (with an inter-bed configuration for example), the means allowing passage of the liquid through the tray comprises both chimneys and orifices. These liquid passage means are arranged between the exclusive gas passage chimneys. The number of liquid passage means is advantageously greater than the number of exclusive gas passage chimneys. The pitch of the liquid passage means can be triangular or square. In order to achieve good liquid delivery and good distribution of the liquid on the gas/liquid contactor, the liquid passage means are uniformly distributed over the tray to be arranged over the entire surface of the tray between the gas passage chimneys.

Alternatively, notably in the case of a distributor tray arranged in the exchange column bottom, the liquid passage means correspond to downcomers. The distributor tray downcomers are conventionally provided on the periphery of the tray for single-pass trays and they can be arranged on central sections for multi-pass trays, according to the column diameter.

According to a variant embodiment, (not shown) but described in patent application EP-3,034,142 corresponding to US published patent application 2016-0175,733), the distributor tray comprises liquid collection and distribution levels. Apart of the liquid from the upper level passes to the lower level prior to being delivered below the base of the tray. Another part of the liquid contained in the upper level is directly supplied to the base of the lower level. This configuration improves liquid distribution for high liquid flow rates, notably for a wide liquid flow rate variation range while providing a reduced space requirement.

Figure 3:
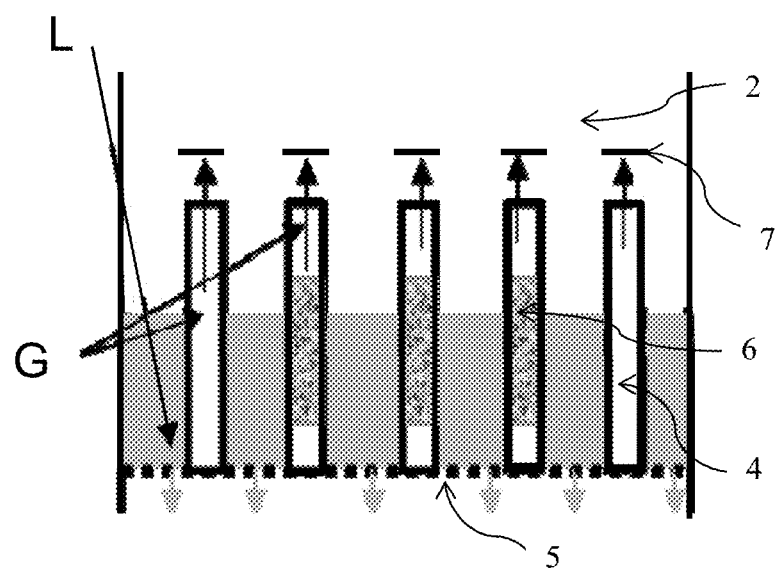
FIG. 3 illustrates a distributor tray according to a first embodiment of the invention.

FIG. 3 illustrates a non-limitative example of a distributor tray according to the invention. FIG. 3 is a cross-sectional view of a portion of the distributor tray. Thus, FIG. 3 shows a distributor tray 2 comprising chimneys 4 for exclusive passage of gas G, projecting from the upper part of the tray, as well as a plurality of orifices 5 allowing passage of liquid L from below tray 2. According to this embodiment of the invention, some of exclusive gas passage chimneys 4 are provided with a gas dispersive material 6 and some exclusive gas passage chimneys 4 comprise no gas dispersive material 6. According to this embodiment, all of the exclusive gas passage chimneys comprise a cap 7 preventing the liquid from passing through the chimney.

Figure 4:
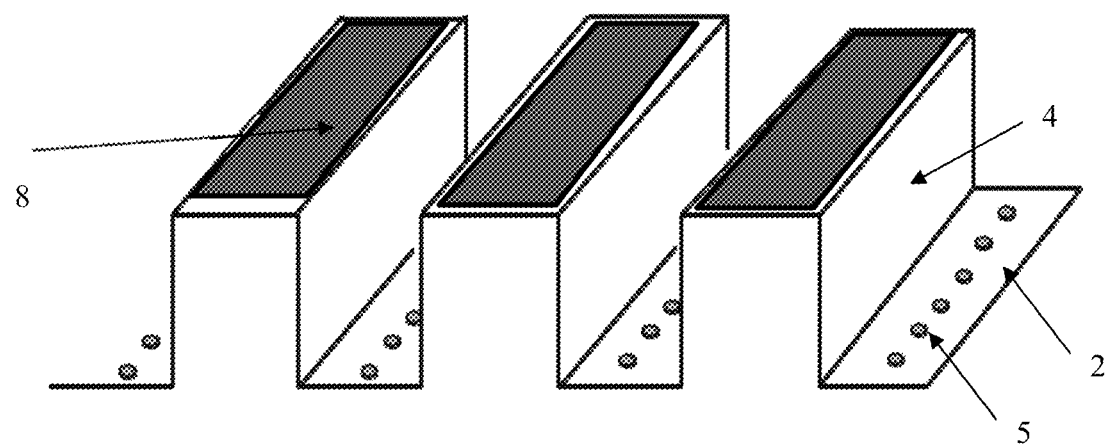
FIG. 4 illustrates a distributor tray according to a second embodiment of the invention.

According to the non-limitative example of FIG. 4, exclusive gas passage chimneys 4 are of parallelepipedic shape and they project from the upper part of tray 2. According to this example, exclusive gas passage chimneys 4 comprise a wide opening 8 allowing passage of the gas to the surface thereof. According to this example, means 5 allowing passage of the liquid through the tray correspond to orifices provided between gas passage chimneys 4. However, the liquid passage means can be other means, notably liquid passage chimneys or downcomers.

Figure 5:
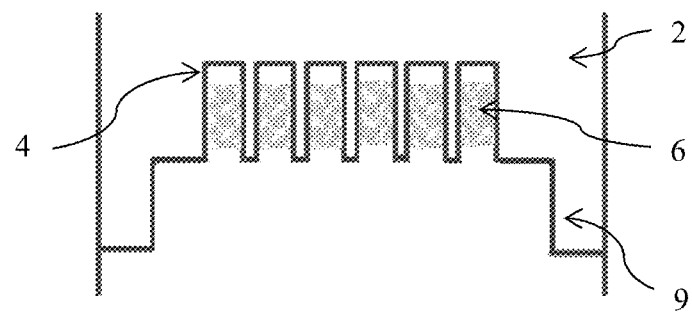
FIG. 5 illustrates an embodiment of a distributor tray according to the invention.

According to another non-limitative example shown in FIG. 5, exclusive gas passage chimneys 4 are of parallelepipedic shape and project from the upper part of tray 2. Tray 2 comprises means 5 allowing passage of the liquid through the tray in form of downcomers 9 arranged on the periphery of tray 2. According to this embodiment of the invention, the liquid flows down from the upper part of the tray to the lower part of the tray by passing through a downcomer 9. The gas coming from the lower part of the tray flows counter-currently in the column, through the exclusive gas passage chimneys, which are all, according to this embodiment of the invention, provided with a gas dispersive material.

The invention also relates to a column for matter and/or heat exchange between two fluids, wherein two fluids are contacted by at least one gas/liquid contactor. The column comprises at least a first inlet for a liquid fluid, at least a second inlet for a gaseous fluid, at least a first outlet for a gaseous fluid and at least a second outlet for a liquid fluid. The column also comprises at least one distributor tray as described above, allowing homogeneous distribution of the gas onto the gas/liquid contactor.

According to an embodiment of the present invention, the column comprises a distributor tray as described above, arranged in the column bottom. Advantageously, the distributor in the column bottom is preceded by a gas phase pre-distribution device.

According to an embodiment of the invention, the column has sections with each section comprising a gas/liquid contactor and a distributor tray as described above.

Advantageously, the gas/liquid contactor is a structured packing bed. Alternatively, the gas/liquid contactor is a random packing bed.

Preferably, the gas and the liquid flow through the column under counter-current conditions.

The column according to the invention can be used in gas treatment, $CO_2$ capture (amine wash for example), distillation, dehydration or air conversion methods. Furthermore, the invention can be used with any solvent type.

IMPLEMENTATION EXAMPLES

In order to illustrate the advantages of the present invention, a comparison is hereafter of results obtained using an exchange column equipped according to the present invention with those obtained using a column of the prior art (i.e. without gas dispersive material in at least one exclusive gas passage chimney).

Thus, according to a first example, a 3.76-m diameter exchange column is considered. This column comprises a single distributor tray according to the invention, arranged in the bottom of the column. This tray comprises gas passage chimneys of rectangular shape with each chimney being topped by a cap and each chimney is provided with a gas dispersive material in form of a structured packing. The main characteristics of the column according to the invention are detailed hereafter:

Distributor tray height: 1.4 m
Number of exclusive gas passage chimneys: 6
Chimney height: 0.555 m
Structured packing thickness within the gas chimneys: 0.555 m
Distance between chimneys and caps: 0.1 m
Distance between chimney outlet and packing bed (the packing being modelled by a porous medium): 0.9 m
Superficial gas velocity in the column: Vsg=0.35 m/s
Gas kinetic factor: 2.7 $Pa^{0.5}$
Pressure: atmospheric pressure
Temperature: 25° C.

The performance, in terms of gas distribution, of this column according to the invention is compared with those of a column according to the prior art (i.e. without gas dispersive material in at least one exclusive gas passage chimney) having the same characteristics, except for the presence of a dispersive material in all the gas passage chimneys.

FIGS. 6a and 6c respectively show the average velocity (or velocity norm) and the vertical velocity downstream from the distributor according to the prior art, and FIGS. 6b and 6d respectively show the average velocity (or velocity norm) and the vertical velocity downstream from the distributor according to the invention. Comparison of the results obtained with the distributor tray according to the prior art and according to the invention clearly shows that the velocities are more homogeneous with a column equipped with the distributor tray according to the invention. Of particular note is, in the case of the distributor tray according to the invention, a disappearance of the overspeeds which are observed on the edges of the column wall in the case of the column according to the prior art.

In a second invention implementation example, an exchange column comprising a distributor tray according to the invention is considered having the characteristics described in the above example, except that the column diameter is 7 m instead of 3.76 m. The performances, in terms of gas distribution, of this column according to the invention are compared with those of the 3.76-m diameter column according to the invention described in the first example. The results between the two columns are compared 5 cm upstream from the packing bed.

FIGS. 7a and 7c respectively show the average velocity (or velocity norm) and the vertical velocity downstream from a distributor according to the first invention implementation example (column diameter D=3.76 m), and FIGS. 7b and 7d respectively show the average velocity (or velocity norm) and the vertical velocity downstream from a distributor according to the second implementation example (column diameter D=7 m). It can be observed in these Figs. that the velocities remain homogeneous despite the column diameter increase, including on the edges of the column.

This clearly shows that the distributor tray according to the invention ensures a more efficient operation, even in the case of large-diameter columns.

Thus, the distributor tray according to the invention enables more homogeneous distribution of the gas within an exchange column. Such an improvement can allow the height between the distributor tray and the gas/liquid contactor to be reduced without any risk of column flooding, even in the case of a large-diameter exchange column. The distributor tray according to the invention provides better contact between the gas and liquid phases, and therefore to transfer therebetween.

The invention claimed is:

1. A distributor tray for a column providing at least one of heat and matter exchange between a gas and a liquid, comprising at least one chimney projecting from the upper part of the tray for exclusive passage of the gas through the tray and at least one means for enabling passage of liquid through the tray, at least one of the chimneys providing exclusive gas passage including material which disperses the gas; and wherein the material which disperses the gas is uniformly distributed within the at least one of the chimneys for providing exclusive passage of the gas within the at least one chimney in a longitudinal direction and in a transverse plane and which provides a homogeneous distribution of velocity of the gas at an outlet of the at least one chimney and the material which disperses the gas is a random or structured packing.

2. A tray as claimed in claim 1, wherein the dispersive material is distributed over a thickness at least greater than 10 cm.

3. A tray as claimed in claim 1, wherein the chimney for exclusive passage of the gas is substantially parallelepipedic.

4. A tray as claimed in claim 1, wherein the chimney for exclusive passage of the gas is substantially cylindrical.

5. A tray as claimed in claim 1, wherein all of the chimneys for the exclusive passage of the gas are provided with the material which disperses the gas.

6. A tray as claimed in claim 1, wherein the at least one means for enabling passage of liquid through the tray comprises at least one of orifices and chimneys.

7. A tray as claimed in claim 6, wherein the at least one means for enabling passage of liquid through the tray comprises liquid passage chimneys projecting from at least one of an upper part and from a lower part of the tray.

8. A tray as claimed in claim 1, wherein the tray comprises means for enabling passage of liquid through the tray are uniformly distributed on the tray.

9. A tray as claimed in claim 1, wherein the at least one means for enabling passage of liquid through the tray comprises downcomers arranged on a periphery of the tray.

10. An exchange column for at least one of heat and matter exchange between a gas and a liquid, which are contacted by at least one gas/liquid contactor, wherein the column comprises at least one distributor tray as claimed in claim 1 for distributing the gas and the liquid over at least one gas/liquid contactor.

11. An exchange column as claimed in claim 10, wherein the at least one distributor tray is located at a bottom of the column.

12. An exchange column as claimed in claim 10, wherein the exchange column comprises sections with each section comprising a gas/liquid contactor and a distributor tray.

13. A method of using a distributor comprising in a column which performs at least one of heat and matter exchange between a gas and a liquid, the column comprising at least one chimney projecting from the upper part of the tray for exclusive passage of the gas through the tray and at least one means for enabling passage of liquid through the tray, at least one of the chimneys providing exclusive gas passage includes a material which disperses the gas, the method comprising:

dispersing the gas within the at least one chimney with the material which disperses in a longitudinal direction and in a transverse plane with the material which disperses comprising a random or structured packing which provides one of gas treatment, $CO_2$ capture, distillation, dehydration and air conversion.

* * * * *